United States Patent
Kim et al.

(10) Patent No.: US 6,556,255 B1
(45) Date of Patent: Apr. 29, 2003

(54) METHOD AND APPARATUS FOR GENERATING AND RESETTING MELODY FOR REMOTE CONTROLLER FUNCTION KEYS

(75) Inventors: Joo Won Kim, Kumi (KR); Jae Kyung Lee, Daeku (KR); Jin Kuk Jeoung, Kumi (KR); Bong Chun Shim, Kumi (KR); Gwon Sool Jung, Daeku (KR)

(73) Assignee: LG Electronicis Inc., Seoul (KR)

( * ) Notice: Subject to any disclaimer, the term of this patent is extended or adjusted under 35 U.S.C. 154(b) by 0 days.

(21) Appl. No.: 09/115,692

(22) Filed: Jul. 15, 1998

(30) Foreign Application Priority Data

Jul. 15, 1997 (KR) .............................................. 97-32778

(51) Int. Cl.$^7$ .............................. H04N 5/50; H04N 5/44; G08C 19/00; G08C 19/12; H04B 1/06
(52) U.S. Cl. ...................... 348/734; 348/725; 348/569; 348/14.05; 340/825.69; 340/825.72; 340/692; 340/384.1; 455/352; 455/355; 341/176
(58) Field of Search ................................ 348/734, 725, 348/569, 14.05; 340/825.69, 825.72, 692, 384.1; 341/176, 27; 455/352, 355, 151.1, 151.2, 550, 575; 379/374.01; H04N 5/44

(56) References Cited

U.S. PATENT DOCUMENTS

| | | | |
|---|---|---|---|
| 3,983,553 A | * 9/1976 | Kesling | 340/365 |
| 4,454,509 A | * 6/1984 | Buennagel et al. | 340/825.69 |
| 4,523,193 A | * 6/1985 | Levinson et al. | 340/825.69 |
| 5,095,307 A | * 3/1992 | Shimura et al. | 340/825.44 |
| 5,182,552 A | * 1/1993 | Paynting | 340/825.25 |
| 5,311,175 A | * 5/1994 | Waldman | 341/34 |
| 5,329,370 A | * 7/1994 | Yazolino et al. | 348/734 |
| 5,764,179 A | * 6/1998 | Tsurumoto | 341/176 |
| 5,815,081 A | * 9/1998 | Motohashi | 340/825.44 |
| 6,006,102 A | * 12/1999 | Touzeau | 455/517 |
| 6,070,053 A | * 5/2000 | Yamashita | 455/31.1 |
| 6,070,055 A | * 5/2000 | Uchida | 455/38.4 |
| 6,075,998 A | * 6/2000 | Morishima | 455/567 |

* cited by examiner

Primary Examiner—John Miller
Assistant Examiner—Paulos Natnael
(74) Attorney, Agent, or Firm—Birch, Stewart, Kolasch & Birch, LLP

(57) ABSTRACT

An apparatus for processing a remote controller signal and a method using the same, and in particular to an apparatus for setting and generating a melody for a remote controller input signal and a method using the same capable of generating a melody corresponding to a predetermined inputted key, whereby melodies for each key are set, the melody corresponding to the predetermined inputted key is generated, thus a viewer confirms the key is exactly inputted, and furthermore, the viewer sets the melody corresponding to the predetermined key, and the melody is generated when the key is inputted, and thus the viewer is not bored because of an operational delay of a specific function and can confirm a preferred key is inputted.

8 Claims, 8 Drawing Sheets

| NUMBER | CONTENTS |
|---|---|
| 1 | SOUND OF FALLING WATER |
| 2 | SOUND OF BIRD'S SINGING |
| 3 | SOUND OF BELL |
| 4 | SOUND OF MUSICAL INSTRUMENT |
| ⋮ | ⋮ |

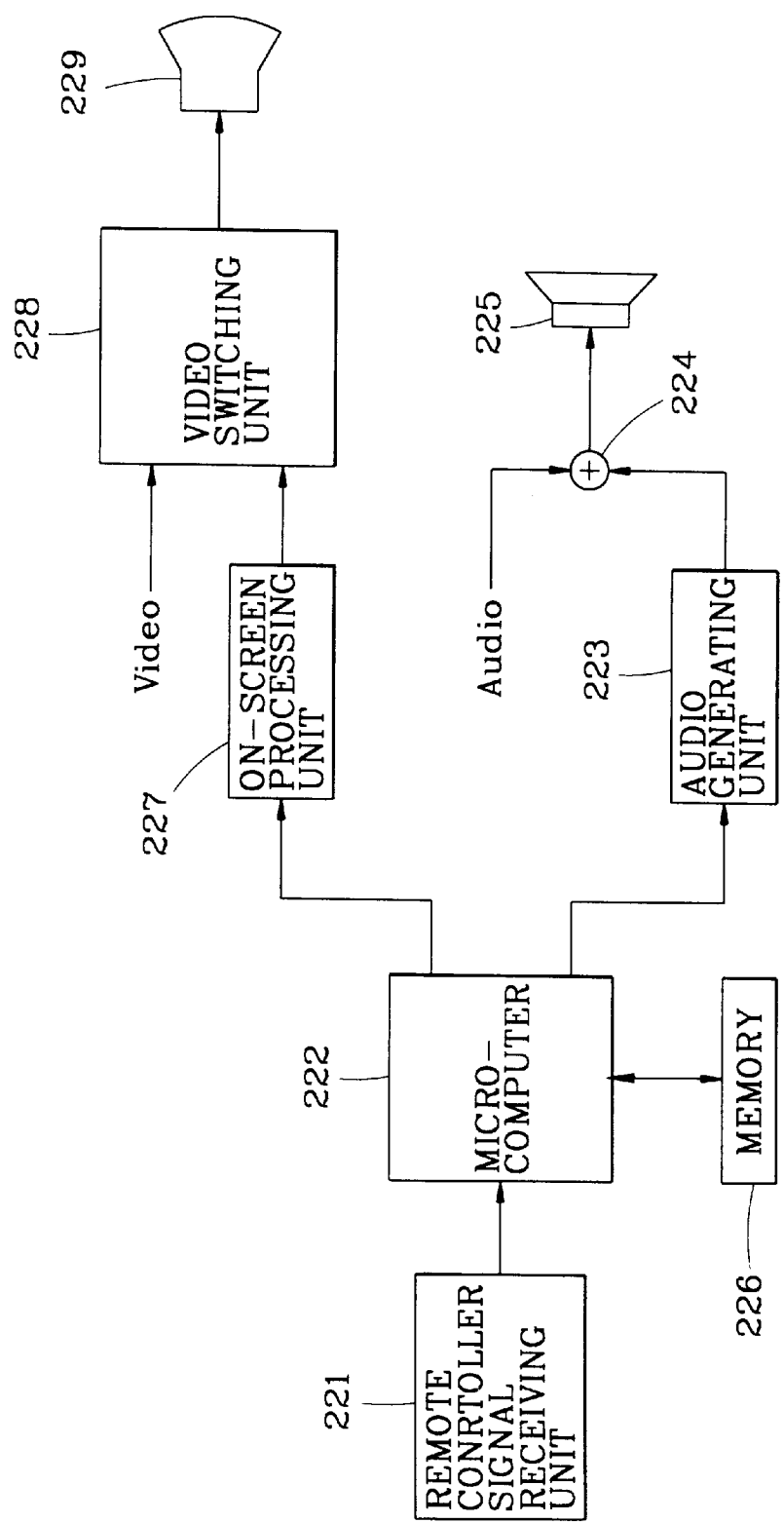

FIG. 7A

```
REMOTE CONTROLLER MELODY SET

* PRESS A PREFERRED KEY
```

FIG. 7B

```
* POWER KEY INPUT
1. SOUND OF BIRD'S SINGING
2. SOUND OF FALLING WATER
3. SOUND OF GONG
4. SOUND OF BELL
```

FIG. 7C

```
* POWER KEY INPUT

4. SOUND OF BELL

* PRESS A CONFIRMATION KEY FOR
  MELODY SET
```

FIG. 8A

```
REMOTE CONTROLLER MELODY SET

* PRESS A PREFERRED KEY
```

FIG. 8B

* POWER KEY INPUT
1. 🐦 : SOUND OF BIRD'S SINGING
2. 〰 : SOUND OF FALLING WATER
3. ◯ : SOUND OF DRUM
4. 🔔 : SOUND OF BELL

FIG. 8C

* POWER KEY INPUT
1. 🐦     1) NIGHTINGALE
          2) CUCKOO
          3) CANARY
              ⋮

FIG. 8D

* POWER KEY INPUT
   1) NIGHTINGALE

* PRESS A CONFIRMATION KEY FOR MELODY SET

| KEY | SET MELODY |
|---|---|
| POWER KEY | SOUND OF BIRD'S SINGING |
| CH UP | SOUND OF WATERFALL |
| CH DOWN | SOUND OF GONG |
| VOLUME UP | SOUND OF DRUM |
| VOLUME DOWN | SOUND OF BELL |

METHOD AND APPARATUS FOR GENERATING AND RESETTING MELODY FOR REMOTE CONTROLLER FUNCTION KEYS

BACKGROUND OF THE INVENTION

1. Field of the Invention

The present invention is directed to an apparatus for processing a remote controller signal and a method using the same, and in particular to an apparatus for setting and generating a melody for a remote controller input signal and a method using the same capable of generating a melody which corresponds to an inputted key.

2. Description of the Background Art

FIG. 1 is a block diagram of a conventional apparatus for processing a remote controller signal. As shown in FIG. 1, the conventional apparatus includes: a video unit 109 processing a video intermediate frequency signal of intermediate frequency signals IF from a tuner 108 and outputting a video signal; a character display generating unit 107 generating a character display signal and a switching signal; a switching unit 110 switching the video output signal from the video unit 109 and the character display signal from the character display generating unit 107 in accordance with the switching signal from the character display generating unit 107, and outputting the switched signals to a picture tube 110; an audio unit 104 processing an audio intermediate frequency signal from the intermediate frequency signals IF from the tuner 104, and outputting an audio signal; a microcomputer 103 detecting a key matrix 101 in accordance with a remote controller signal from a pre-amp 102, outputting an audio signal in accordance with a detection result, and controlling a driving of the tuner 108; and a synthesizing unit 105 synthesizing the audio signal from the microcomputer 103 and the audio output signal from the audio unit 104, and outputting the synthesized signal to a speaker 106.

FIG. 2 is a block diagram sequentially illustrating a remote controller signal processing by the conventional apparatus in FIG. 1.

The operation of the conventional apparatus for processing the remote controller signal will now be explained.

First, in the case that a remote controller input is set, when the remote controller signal which is outputted from the pre-amp 103 is applied to the microcomputer 103, the microcomputer 103 serves to receive the remote controller signal and decode a state of a key of the key matrix. Here, it is determined whether the remote controller signal is a key by which a succeeding operation is carried out. In the case that the succeeding operation is determined to be performed according to the key, a soft tone or sound of a low frequency is outputted from the microcomputer 103, then the outputted signal is applied to the speaker 106 through the synthesizing unit 105, and thus the state of the key is detected.

At the same time, the tuner 108 serves to drive the video unit 109 and audio unit 104 by applying an intermediate frequency output signal in accordance with the key. Then, the audio signal is outputted to the speaker 106 through the synthesizing unit 105, the video output signal is outputted to the picture tube 111 through the switching unit 110, and thereby the operation in accordance with the key is carried out and completed.

On the other hand, when it is determined that the inputted key is a key which will not be operated, a high tone or sound output signal which is outputted from the microcomputer 103 is applied to the speaker 106 through the synthesizing unit 105, and thereby a current state of the key is detected and the operation is completed.

Accordingly, when a remote controller key is pressed, in case the key is normal, a current audio signal and a soft tone or sound signal are synthesized by the synthesizing unit 105, and then the synthesized signal is applied to the speaker 106. Therefore, whenever the remote controller key is inputted, a tone is outputted through the speaker 106, and a state of the current remote controller key is detected.

However, the conventional apparatus for processing the remote controller a signal has a disadvantage in that a high or low tone is generated according to a simple key input, and thus whether a key is exactly inputted is not confirmed and information of an inputted key cannot be discriminated.

Furthermore, especially in a combined remote controller which can control the operation of several devices, in the case that a key which does not have a function is pressed, an operation corresponding to the key is not carried out, and therefore it may be recognized as a mis-operation.

SUMMARY OF THE INVENTION

Therefore, it is an object of the present invention to provide an apparatus for processing a remote controller signal and a method using the same by setting a melody to each key and generating a melody which corresponds to an inputted key which has a function, and thereby a viewer can confirm whether a key is exactly inputted.

In order to achieve the above-described object of the present invention, there is provided an apparatus for generating a melody for a remote controller signal, including: a remote controller signal receiving unit receiving a remote controller signal; a control unit decoding the output signal from the remote controller signal receiving unit, and outputting a corresponding code signal; an audio generating unit outputting a melody signal corresponding to the code signal from the control unit; and an audio synthesizing unit synthesizing an audio signal and the output signal from the audio generating unit, and outputting the synthesized signal to the speaker, whereby melodies corresponding to respective inputted keys are generated.

In addition, in order to achieve the above-described object of the present invention, there is provided an apparatus for setting and generating a melody for a remote controller signal, including: an on-screen processing unit outputting an on-screen display signal and displaying a melody set video on a screen of a display device in the case of a melody set mode which corresponds to each inputted key; a memory storing melody information corresponding to each inputted key; a remote controller signal receiving unit receiving a remote controller signal; a control unit decoding an output signal from the remote controller signal receiving unit, outputting the on-screen display control signal to the on-screen processing unit, selecting a specific key and a melody corresponding to the key on the melody set video which is displayed on the screen of the display device, and storing the selected key and melody information in the memory in the case of a melody set mode corresponding to each inputted key, and decoding the output signal from the remote controller signal receiving unit, reading the melody information which corresponds to the inputted key from the memory and outputting the melody information in the case of a normal remote controller signal input; an audio generating unit outputting a melody signal corresponding to a code signal from the control unit; and an audio synthesizing unit synthesizing an audio signal and the output signal from the audio generating unit, and outputting the synthesized signal to a speaker. In addition, in the case that a key which does not have a function is inputted, a key input error is displayed as an on-screen video by the on-screen processing unit.

In order to achieve the above-described object of the present invention, there is provided a method for generating a melody for a remote controller signal, including: determining whether the remote controller signal is inputted; determining whether an inputted key is a function key by decoding the remote controller signal; generating a melody corresponding to the key in the case that the inputted key is determined to be the function key; and generating an error sound or displaying an error caption in the case that the inputted key is not the function key.

In addition, in order to achieve the above-described object of the present invention, there is provided a method for setting and generating a melody for a remote controller signal, including: determining whether a melody set mode corresponding to an inputted key is selected; displaying a set screen by an on-screen video in the case of the melody set mode; designating a specific key and selecting a melody which corresponds to the key; and storing melody information when the melody corresponding to the specific key is selected and a confirmation key is inputted.

That is, in order to achieve the above-described object of the present invention, there is provided a method for setting and generating a melody for a remote controller signal, including: discriminating a melody set for a key input; registering a melody corresponding to each key in the case of the melody set; discriminating the key input; and outputting the melody corresponding to the key at the time of the key input.

BRIEF DESCRIPTION OF THE DRAWINGS

The present invention will become better understood with reference to the accompanying drawings which are given only by way of illustration and thus are not limitative of the present invention, wherein:

FIG. 6 is a block diagram illustrating the apparatus for setting and generating the melody for the remote controller signal in accordance with a third embodiment of the present invention;

FIGS. 7(a) to 7(c) and 8(a) to 8(d) respectively illustrate melody set screens of the apparatus in FIG. 6;

DETAILED DESCRIPTION OF THE INVENTION

An apparatus for setting and generating a remote controller signal and a method using the same in accordance with the present invention will now be described in detail with reference to the accompanying drawings.

Figure 1:
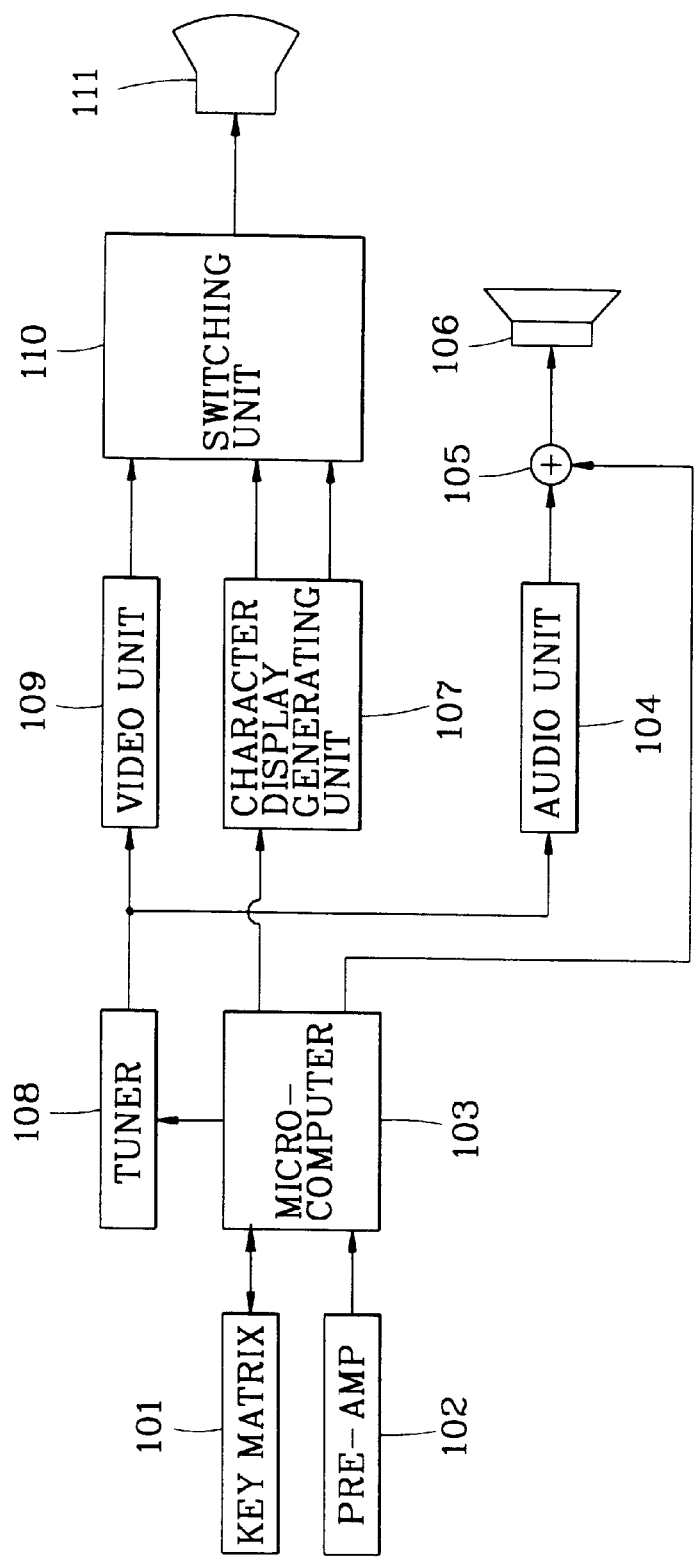
FIG. 1: is a block diagram illustrating a conventional apparatus for processing a remote controller signal.
Figure 2:
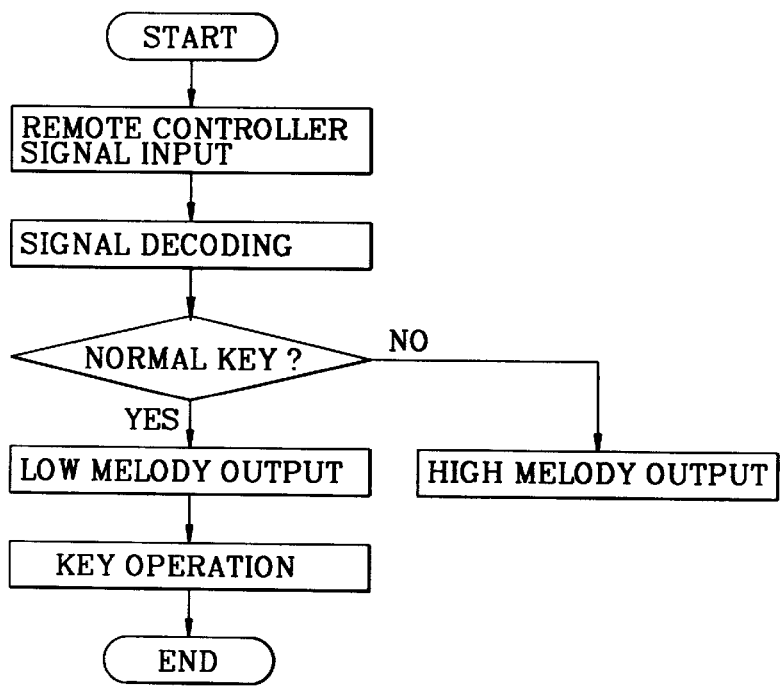
FIG. 2 is a signal flowchart of the conventional apparatus in FIG. 1.
Figure 3:
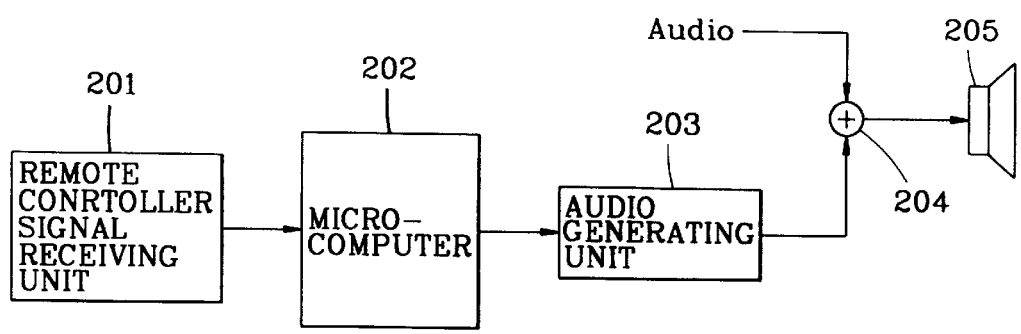
FIG. 3 is a block diagram illustrating an apparatus for generating a melody for a remote controller signal in accordance with a first embodiment of the present invention.

FIG. 3 illustrates the apparatus for generating the melody for the remote controller signal in accordance with a first embodiment of the present invention. Melody information corresponding to a specific inputted key is set at an initial stage of fabrication.

As shown therein, the apparatus for generating the melody for the remote controller signal in accordance with the first embodiment of the present invention, includes: a remote controller signal receiving unit 201 receiving the remote controller signal; a microcomputer 202 decoding the output signal from the remote controller signal receiving unit 201, and outputting corresponding melody information; an audio generating unit 203 generating a melody signal corresponding to the melody information of the microcomputer 202; and an audio synthesizing unit 204 synthesizing an audio reproducing signal and the melody signal from the audio generating unit 203, and outputting the synthesized signal to a speaker 205.

The operation and effects of the apparatus for generating the melody for the remote controller signal in accordance with the first embodiment of the present invention will now be described.

First, when a viewer inputs a specific key, for instance, a power key through a remote controller (not shown), the remote controller signal receiving unit 201 receives a remote controller signal, and the microcomputer 202 decodes the output signal from the remote controller signal receiving unit 201.

Here, in the case that the microcomputer 202 determines that the power key is inputted, the microcomputer 202 outputs the melody information corresponding to the power key to the audio generating unit 203.

The audio generating unit 203 generates the melody signal corresponding to the power key, and then the audio synthesizing unit 204 synthesizes the melody signal and the reproducing audio signal, and outputs the synthesized signal to the speaker 205. Therefore, the viewer can recognize that the power key is inputted without watching a device.

However, in accordance with the first embodiment of the present invention, each melody corresponding to a plurality of keys is set at an initial stage of fabrication, and thus the viewer who frequently uses the apparatus may be bored of it.

Accordingly, another embodiment of the present invention is suggested so that the viewer can set each melody for the plurality of keys by himself.

A memory 216 storing melody information corresponding to an inputted key is added to an apparatus for setting and generating a melody for a remote controller signal according to a second embodiment of the present invention.

Figures 4, 5:
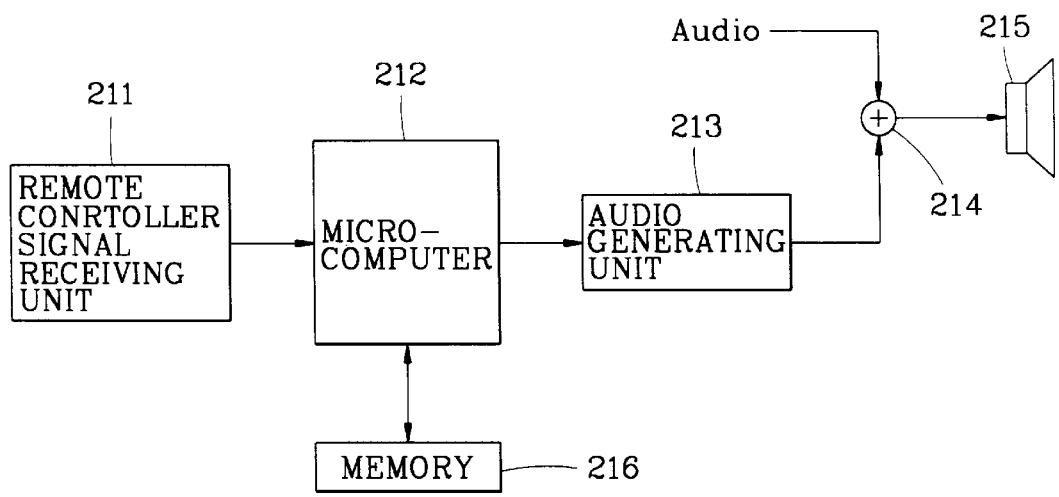
FIG. 4 is a block diagram illustrating an apparatus for setting and generating the melody for the remote controller signal in accordance with a second embodiment of the present invention.
FIG. 5 is an exemplary table for a melody set of the apparatus in FIG. 4.

FIG. 4 is a block diagram illustrating the apparatus for setting and generating the melody for the remote controller signal in accordance with the second embodiment of the present invention. As shown therein, the apparatus including: a remote controller signal receiving unit 211 receiving a remote controller signal; a memory 216 storing melody information corresponding to each inputted key; a microcomputer 212 decoding an output signal from the remote controller signal receiving unit 211, then storing the melody information corresponding to each inputted key in the memory 216 in the case of a melody information set corresponding to the inputted key, and reading the melody information corresponding to the key from the memory 216 and outputting the melody information in the case of a normal function key input; an audio generating unit 213 generating an audio signal corresponding to the inputted key pursuant to the melody information from the microcomputer 212; and an audio synthesizing unit 214 synthesizing an audio signal and the output signal from the audio generating unit 213, and outputting the synthesized signal to a speaker 225.

The melody information for the specific key is set at an initial stage of fabrication in the apparatus according to the second embodiment of the present invention, as identical to the apparatus according to the first embodiment of the present invention. Therefore, in the case that the viewer intends to change the melody information for each key, a table for the melody information which can be used for a predetermined inputted key, as shown in FIG. 5, is provided in the guide manual.

The operation and effects of the apparatus for setting and generating the melody for the remote controller signal in accordance with the second embodiment of the present invention will now be described.

First, when the melody information to the inputted key which is set at the initial stage of the fabrication is not changed, the operation of the apparatus is identical to that of the apparatus according to the first embodiment of the present invention.

However, in the case that a function key is inputted, the microcomputer 212 serves to read the melody information for the inputted key from the memory 216, and output the information to the audio generating unit 213.

In case the viewer sets a melody set mode corresponding to a key through the remote controller in order to change the melody information for a predetermined inputted key, the microcomputer 212 receiving and decoding the output signal from the remote controller signal receiving unit 211 serves to set the melody set mode corresponding the key.

At this time, the viewer selects a predetermined key, for example, a power key, and presses a confirmation key, and then a number key in the table in FIG. 5 to select a preferred melody.

When the viewer presses the confirmation key to set the preferred melody for the selected predetermined key, for instance, when the viewer sets a sound of a bell corresponding to number 3, the microcomputer 212 changes the melody information for the power key to the sound of the bell of number 3, and stores the melody information in the memory 216.

Then, when the power key is inputted, the microcomputer 212 which decodes the output signal from the remote controller signal receiving unit 216, recognizes the inputted power key, reads the melody information corresponding to the sound of the bell from the memory 216, and outputs the melody information to the audio generating unit 213.

Here, the audio generating unit 213 generates an audio signal of the sound of the bell which corresponds to the melody information from the microcomputer 212.

Then, when the audio synthesizing unit 214 outputs the audio signal from the audio generating unit 213 to the speaker 215, the sound of the bell is reproduced, and the viewer recognizes by the sound of the bell that the power key is exactly inputted.

Nevertheless, the apparatus for setting and generating the melody for the remote controller signal in accordance with the second embodiment of the present invention also has a disadvantage in that it is inconvenient for the viewers to set the melody information for the inputted key.

Therefore, there is provided an apparatus for setting and generating the melody for the remote controller signal in accordance with a third embodiment of the present invention. Melody information which can be set for each inputted key is displayed as a video in the third embodiment of the present invention. When the viewer selects predetermined information from the melody information, the predetermined information is automatically set and stored as the melody information for the inputted key.

FIG. 6 is a block diagram illustrating the apparatus for setting and generating the melody for,the remote controller signal in accordance with the present invention. As shown therein, the apparatus includes: a remote controller signal receiving unit 221 receiving a remote controller signal; a memory 226 storing the melody information corresponding to each inputted key; a microcomputer 222 decoding the output signal from the remote controller signal receiving unit, then outputting an on-screen display control signal for a melody set screen and storing the melody information corresponding to each inputted key in a memory 226 in the case of a melody information set corresponding to the inputted key, and reading the melody information which corresponds to the key from the memory 226 and outputting the melody information in the case of a normal function key input; an on-screen processing unit 227 outputting an on-screen video data corresponding to the on-screen display control signal from the microcomputer 222; a video switching unit 228 switching a video signal and the output signal from the on-screen processing unit 227, and outputting the switched signal to a picture tube 229; an audio generating unit 223 generating an audio signal which corresponds to the inputted key in accordance with the melody information from the microcomputer 222; and an audio synthesizing unit 224 synthesizing an audio signal and the output signal from the audio generating unit 223, and outputting the synthesized signal to a speaker 225.

The operation and effects of the apparatus for setting and generating the melody for the remote controller signal in accordance with the third embodiment of the present invention will now be described.

First, identically to the first embodiment of the present invention, the melody information for the specific key is set at the initial stage of fabrication. In the case that the melody information for the inputted key which is set at the initial stage of fabrication is not changed, the operation of the apparatus is identical to that of the apparatus in accordance with the first embodiment of the present invention.

However, when a function key is inputted as in the second embodiment of the present invention, the microcomputer 222 reads the melody information for the inputted key from the memory 226, and outputting the melody information to the audio generating unit 223. Therefore, a melody corresponding to the inputted key is outputted to the speaker 225.

In the case that the viewer sets a melody set mode corresponding to a key through a remote controller in order to change the melody information for a predetermined inputted key, the microcomputer 212 which receives and decodes the output signal from the remote controller signal receiving unit 211 serves to set the melody set mode corresponding to the key.

Here, when the microcomputer 222 outputs the on-screen display control signal for a melody set screen to the on-screen processing unit 227, the on-screen processing unit 227 outputs the on-screen video signal to the picture tube 229 through the video switching unit 228.

Caption "Press a preferred key", as shown in FIG. 7(a), is displayed on a screen of the picture tube 229. That is, an initial screen for setting a melody corresponding to the inputted key is displayed.

At this time, when the viewer inputs a predetermined key, for example, a power key and presses a confirmation key, the on-screen processing unit 227 which is controlled by the microcomputer 222 decoding the output signal from the remote controller signal receiving unit 221, outputs the on-screen video signal to the picture tube 229 through the video switching unit 228, and thereby caption "power key input", as shown in FIG. 7(b), is displayed on the screen of the picture tube 229 with the melody information which can be set.

Accordingly, when the viewer watches the set screen, as in FIG. 7(b) and presses a predetermined number through the remote controller, the microcomputer 222 which decodes the output signal from the remote controller signal receiving unit 221 reads the melody information corresponding to the number from the memory 226, and outputs the melody information to the audio generating unit 223. Then, the audio generating unit 223 generates an audio signal which corresponds to the melody information, and the audio signal is outputted to the speaker through the audio synthesizing unit 224. Thus, the viewer can confirm the melody of the selected number.

Therefore, whenever the viewer watches the set screen, as in FIG. 7(b), and selects a predetermined number through the remote controller, a screen is displayed in the picture tube 229, as shown in FIG. 7(c). In the case that the viewer presses the confirmation key for a preferred melody, for example, the sound of the bell, the microcomputer 222 serves to store the melody information of the sound of the bell corresponding to the power key in the memory 226.

The microcomputer 222 stores the melody information corresponding to the power key, and then controls the on-screen processing unit 227 to display an initial set screen, as shown in FIG. 7(a), on the screen of the picture tube 229. Thus, the melody set for another key can be repeatedly carried out.

Consequently, whenever the viewer presses a predetermined key for the melody set, the above-described set operation is repeated.

The screen for the memory set is explained above with reference to FIGS. 7(a) to 7(c). However, there is provided another embodiment enabling the viewer to easily select a melody which corresponds to a predetermined key. That is, as shown in FIG. 8(b), a list of the representative melodies is displayed by both a video and a caption. Here, when one of the melodies is selected, detailed melodies are displayed, as shown in FIG. 8(c).

At this time, in case the viewer selects a predetermined melody by using the transfer keys toward up, down, right and left directions or the number keys, the microcomputer 222 recognizes it and transmits the melody information to the audio generating unit 223, and thus an audio signal corresponding to the melody information is outputted to the speaker 225.

Accordingly, when the viewer listens to a predetermined melody displayed on the screen, as shown in FIG. 8(c), and presses the confirmation key, the microcomputer 222 stores the melody information corresponding to the selected key in the memory 226.

Figures 9, 10:
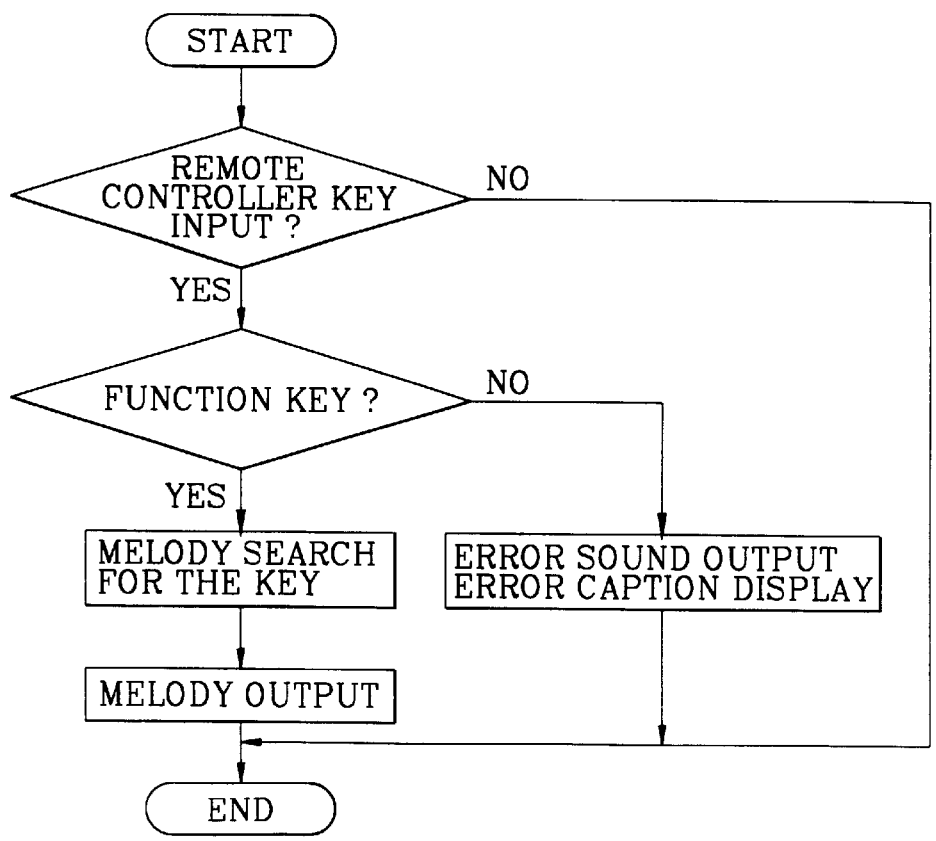
FIG. 9 is an exemplary table indicating set melodies respectively corresponding to inputted keys in accordance with the present invention.
FIG. 10 illustrates a signal flowchart for outputting the melody corresponding to the inputted key in accordance with the present invention.

Then, when the melody set for the predetermined key is completed, as shown in FIG. 9, in case the viewer inputs a specific key, for example, the power key, the remote controller signal receiving unit 221 receives the remote controller signal, and the microcomputer 222 decodes the output signal from the remote controller signal receiving unit 221.

Here, in the case that the microcomputer 222 determines that the power key is inputted, the microcomputer 222 serves to read the melody information corresponding to the power key from the memory 226, and output the melody information to the audio generating unit 223.

Then, when the audio generating unit 223 generates the melody signal corresponding to the power key, namely, an audio signal of a sound of birds singing, the audio synthesizing unit 224 synthesizes the audio signal and the reproducing audio signal and outputting the synthesized signal to the speaker 225. Therefore, the sound of birds singing is reproduced, and the viewer can recognize that the power key is exactly inputted without watching the device.

On the other hand, in the case that the viewer inputs a predetermined key which does not have a function through the remote controller, if the microcomputer 222 which decodes the output signal from the remote controller signal receiving unit 221 determines the predetermined key does not have a function, the microcomputer 222 controls the on-screen processing unit 227 to output the on-screen video signal for displaying an error video display, and at the same time, controls the audio generating unit 223 to output an error audio signal.

Caption "no function" or "key input error" is displayed on the screen of the picture tube 229, or an error sound, for instance, a loud sound is outputted from the speaker 225. Therefore, the viewer can recognize that the key which does not have a corresponding function is inputted.

In addition, the viewer can selectively adjust a melody reproducing time corresponding to the inputted key.

Also, in the case of a large-sized device which has a monitor screen over 25", it takes approximately 6 to 10 seconds to preheat a CPT. Accordingly, the melody which corresponds to the power key is reproduced for the preheating time, and thus the viewer recognizes the device has no problem and the power key is exactly inputted.

Figure 11:
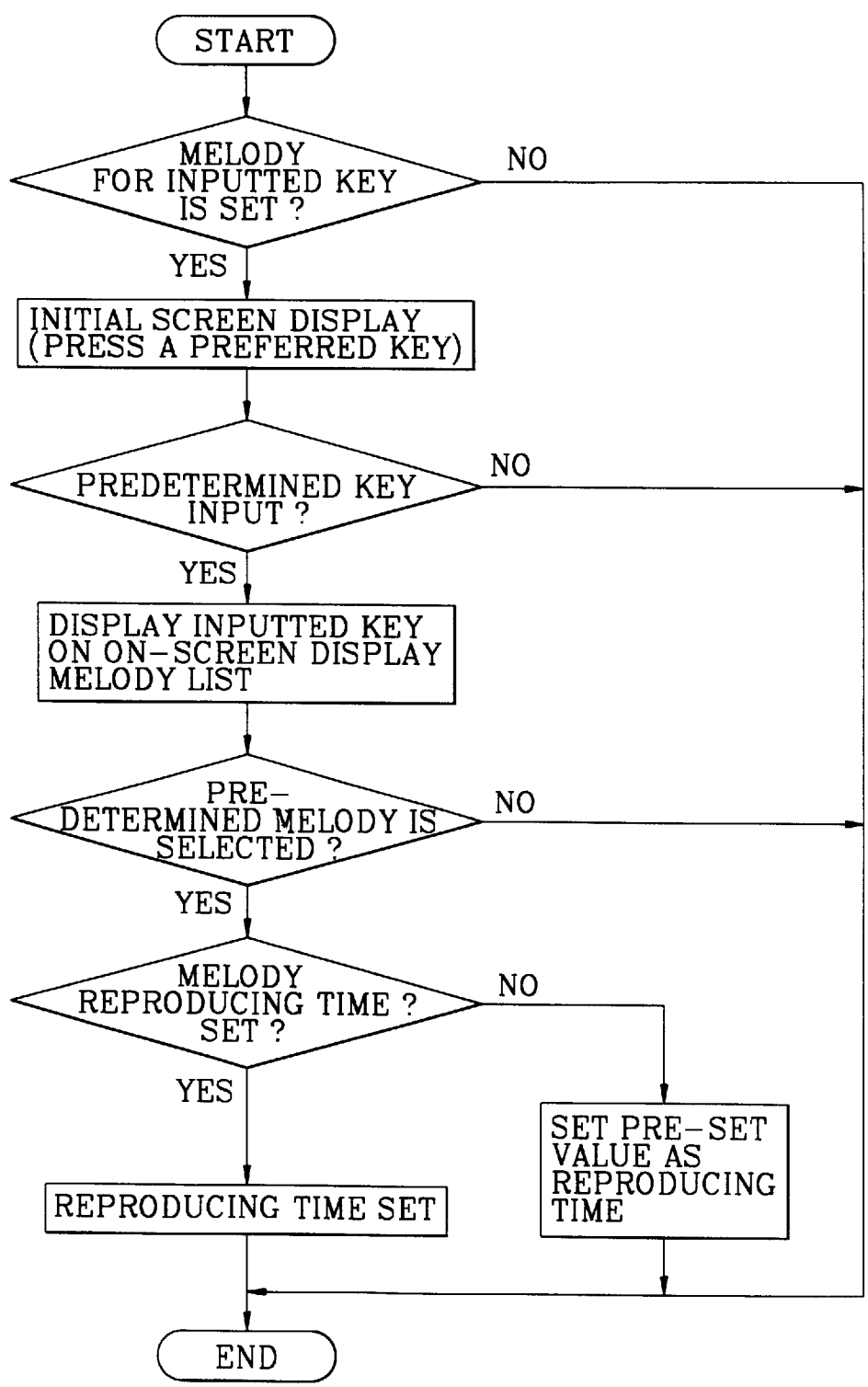
FIG. 11 illustrates a signal flowchart for setting the melody corresponding to the inputted key in accordance with the present invention.

The melody set operation for the predetermined key is carried out identically to a signal flowchart illustrated in FIG. 11, and the melody generating operation is carried out identically to a signal flowchart in FIG. 10.

As described so far, in accordance with the apparatus for setting and generating the melody for the remote controller signal and the method using the same of the present invention, the viewer sets a melody which corresponds to a predetermined key, and when the key is inputted, the melody corresponding to the key is generated, and thus the viewer can confirm whether a preferred key is inputted as well as the viewer is not bored due to an operational delay of a specific function.

As the present invention may be embodied in several forms without departing from the spirit of essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. An apparatus for generating a melody for a remote controller input signal, comprising:

a remote controller signal receiving means for receiving a remote controller signal;

a memory for storing melody information corresponding to each key input;

a control means for decoding an output signal from the remote controller signal receiving means, and in the case of the melody set mode corresponding to each inputted key, outputting an on-screen display control signal to an on-screen processing means, and when a specific key and a melody corresponding to the key from a melody set video displayed on the screen of the display device are selected, storing the selected key and melody information in the memory, and in case of a function key input, decoding the output signal from the remote controller signal receiving means, reading the melody information corresponding to the inputted key and outputting the melody information;

an audio generating means for outputting a melody signal which corresponds to a code signal of the control means; and an audio synthesizing means for synthesizing a reproduced audio signal and the output signal from the audio generating means, and outputting the synthesized signal to the speaker.

2. An apparatus for setting and generating a melody for a remote controller input signal, comprising:

an on-screen display processing means for outputting an on-screen display control signal and displaying a melody set video on a screen of a display device in the case of a melody set mode corresponding to each inputted key press of a remote controller;

a memory for storing melody information corresponding to each inputted key;

a remote controller signal receiving means for receiving a remote controller signal corresponding to each operating input key of the remote controller;

a control means for decoding an output signal from the remote controller signal receiving means, and in the case of the melody set mode corresponding to each inputted key, outputting the on-screen display control signal to the on-screen processing means, and when a specific key and a melody corresponding to the key from a melody set video displayed on the screen of the display device are selected, storing the selected key and melody information in the memory, and in the case of a function key input, decoding the output signal from the remote controller signal receiving means, reading the melody information corresponding to the inputted key and outputting the melody information;

an audio generating means for outputting a melody signal which corresponds to the melody information of the control means; and an audio synthesizing means for synthesizing a reproduced audio signal and the output signal from the audio generating means, and outputting the synthesized signal to the speaker.

3. The apparatus of claim 2, wherein the control means controls the on-screen processing means to generate and display an error caption on the screen and also controls the audio generating means to generate and output an error melody, in the case that a key which does not have a function is inputted.

4. A method for generating a melody for a remote controller input signal, comprising:

reception of an input signal by a remote controller signal receiving unit;

determining whether the input signal corresponds to a remote controller signal;

taking no further action if the input signal corresponds to a signal other than a remote controller signal;

determining if the input signal corresponds to depression of a function key on a remote controller;

searching for melody information in said remote controller input signal receiving unit corresponding to the function key depressed on a remote controller, the melody having been preset by a user according to said user's preference;

generating a melody corresponding to the function key depressed, said melody not having been received along with any input signal; and generating an error sound or displaying an error caption in the case that the inputted key does not have a function.

5. A method for changing a pre-set melody corresponding to a function key on a remote controller, comprising:

selecting a melody set mode for changing a melody corresponding to an inputted key to a different melody corresponding to the same inputted key based on a user preference;

displaying a detailed list of choices of the melodies that are available to be selected for assignment to a function key on screen;

designating a predetermined key and selecting a melody for assignment to the desired corresponding function key; and storing the newly assigned melody to correspond to the specific key selected and pressing a confirmation key to confirm the user selection.

6. The method of claim 5, further comprising a step of setting the length of time the melody corresponding to the inputted key is to be played.

7. The method of claim 5, wherein the melody items are respectively displayed with each representative object video.

8. The method of claim 5, wherein, when a predetermined melody item is selected to set the melody for the inputted key, a corresponding melody is reproduced for a predetermined time.

* * * * *